(No Model.)
W. STEVENS.
ELEVATOR.
No. 348,597. Patented Sept. 7, 1886.
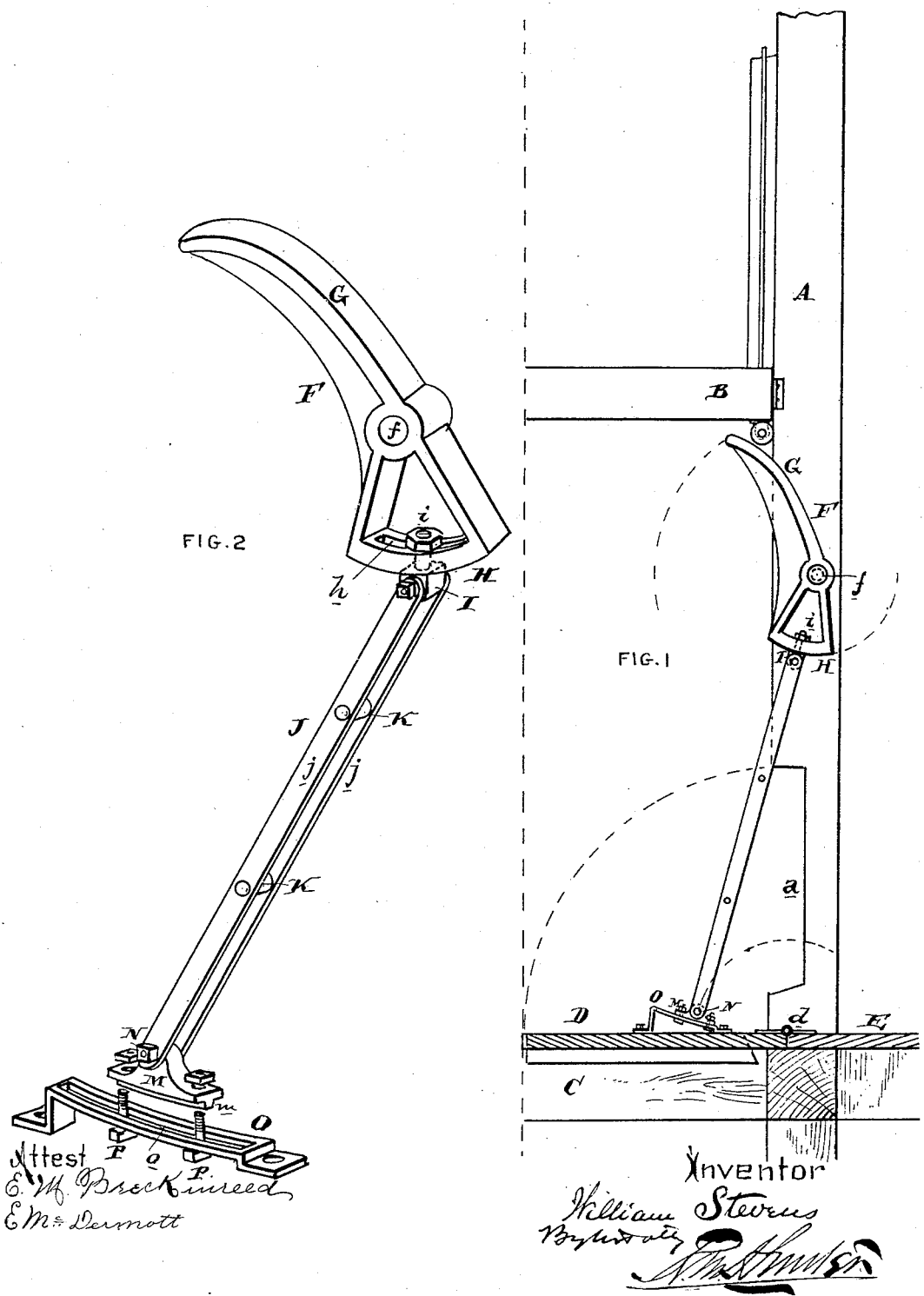

UNITED STATES PATENT OFFICE.

WILLIAM STEVENS, OF PHILADELPHIA, PENNSYLVANIA.

ELEVATOR.

SPECIFICATION forming part of Letters Patent No. 348,597, dated September 7, 1886.

Application filed April 28, 1886. Serial No. 200,395. (No model.)

*To all whom it may concern:*

Be it known that I, WILLIAM STEVENS, of the city and county of Philadelphia, and State of Pennsylvania, have invented an Improvement in Elevators, of which the following is a specification.

My invention has reference to elevators, but more specifically to an improvement upon the means for automatically opening and closing the hatchways upon the ascent or descent of the cage; and it consists of certain improvements, which are fully set forth in the following specification, and shown in the accompanying drawings, which form part thereof.

There are already in use various devices for automatically opening and closing the hatchways of an elevator, but great difficulty is met with in making them adjustable—a thing which is necessary to obtain practical success—and this adjustability is the chief object of my invention.

In the drawings, Figure 1 is an elevation of part of the elevator and the hatchway in section, showing my improvements; and Fig. 2 is a perspective view of the opening and closing apparatus.

A is the elevator-guide, and B is the cage.

C is the hatchway, closed by the doors D, which are hinged to the floor E by the hinges d.

a is a recessed portion of the guide A, to receive the door when opened.

F is a lever consisting of the cam-shaped arm G and the slotted arm H. This lever is pivoted to the guide-frame at its fulcrum f. The arm H of the lever consists of an arc of a circle described from the point f as a center, and is provided with a slot, h.

I is a bolt passing through the slot h and fastened in place by the nut i. To the head of this bolt I the link J, which consists of two metal bars, j and j, united by the rivets K, is so attached that when the arm H is moved to open the hatch-door these bars j j allow it to pass between them. The lower end of this link J is hinged by a bolt, N, to the adjustable hinge-shoe M, having a T-shaped bottom, m. This shoe M fits upon the curved piece O, having the slot o, which is fastened to the hatch-door. The shoe is bolted to the curved piece by bolts P, which have T-shaped heads, and is made adjustable thereon. The curvature of this piece O is an arc of a circle whose radius is the length of the link J.

Now, when the elevator-cage B descends the base of the cage will strike the projecting cam-shaped part of the lever and oscillate said lever, thus forcing up the arm H which, carrying the link J with it, will open the hatch-door. It is evident that the cage in ascending will force open the doors, which will close again by gravity after the cage has passed. The door when opened fits into the recess a and leaves the shaft free for the passage of the elevator. It will be seen that by making the arm H and the plate O with slots the relative connection of the link may be varied, and thus the device may be readily adjusted to suit the exigencies of each case, insuring the door being fully opened and fully closed.

I do not limit myself to the details of construction here shown, nor to any particular shape or form of the parts, as it is clear that these may be modified in many ways without departing at all from the invention.

Having now described my invention, what I claim as new, and desire to secure by Letters Patent, is—

1. The combination of the pivoted lever having two rigid arms, one of which is acted upon by the descending cage and the other of which is adapted to operate the hatch-door, a hinged hatch-door, links connecting said second arm of the lever with the door, and an adjustable connection between the link and lever, substantially as and for the purpose specified.

2. The combination of the pivoted lever having two rigid arms, one of which is acted upon by the descending cage and the other of which is adapted to operate the hatch-door, a hinged hatch-door, links connecting the lever with the door, and an adjustable connection between the link and hatch-door, substantially as and for the purpose specified.

3. The combination of the pivoted lever having two rigid arms, one of which is acted upon by the descending cage and the other of which is adapted to operate the hatch-door, a hinged hatch-door, links connecting the lever with the door, and an adjustable connection between the link and lever and the link and hatch-door, substantially as and for the purpose specified.

4. The combination of the pivoted lever having two rigid arms, one of which is acted upon by the descending cage and the other of which is slotted, a hatch-door, a link hinged to the hatch-door, and an adjustable connection between the link and slotted part of the lever, substantially as and for the purpose specified.

5. The combination of the pivoted lever having two rigid arms, one of which is acted upon by the descending cage and the other of which is slotted and made curved from the fulcrum-point as a center, a hatch-door, a link hinged to the hatch, and an adjustable connection between the link and slotted part of the lever, whereby it may be adjusted upon said lever without changing the distance of its connection with the fulcrum or other throw of the lever, substantially as and for the purpose specified.

6. The combination of the pivoted lever having two rigid arms, one of which is adapted to be acted upon by the descending cage and the other of which is connected to a link, the hatch-door, a curved metal piece upon said door having its curvature made with the link when the door is closed, and an adjustable shoe connected to said curved piece and hinged to the link, whereby the link may be adjusted without raising the door or changing the position of the lever, substantially as and for the purpose specified.

7. A hatch-door-operating device consisting of the lever F, having the arm G and slotted arm H, united by the links J to the hatch-door by means of the adjustable hinge M, with T-shaped bottom and slotted metal piece O, secured to the door, substantially as and for the purpose specified.

8. A hatch-door-operating device consisting of the lever F, having the arm G and slotted arm H, united by the links J to the hatch-door by means of the adjustable hinge M, with T-shaped bottom and slotted curved metal piece O, secured to the door, whose curve is an arc of a circle having the links J as a radius, substantially as and for the purpose specified.

In testimony of which invention I hereunto set my hand.

WILLIAM STEVENS.

Witnesses:
R. M. HUNTER,
JAMES S. PHILLIPS.